United States Patent
Becker et al.

(10) Patent No.: US 10,809,358 B2
(45) Date of Patent: Oct. 20, 2020

(54) MEASURING ARRANGEMENT HAVING AN OPTICAL TRANSMITTER AND AN OPTICAL RECEIVER

(71) Applicant: OSRAM OLED GmbH, Regensburg (DE)

(72) Inventors: Dirk Becker, Langquaid (DE); Martin Haushalter, Regensburg (DE); Claus Jaeger, Regensburg (DE)

(73) Assignee: OSRAM OLED GMBH, Regensburg (DE)

( * ) Notice: Subject to any disclaimer, the term of this patent is extended or adjusted under 35 U.S.C. 154(b) by 0 days.

(21) Appl. No.: 16/483,037

(22) PCT Filed: Jan. 30, 2018

(86) PCT No.: PCT/EP2018/052209
§ 371 (c)(1),
(2) Date: Aug. 1, 2019

(87) PCT Pub. No.: WO2018/141711
PCT Pub. Date: Aug. 9, 2018

(65) Prior Publication Data
US 2020/0116829 A1    Apr. 16, 2020

(30) Foreign Application Priority Data
Feb. 1, 2017  (DE) .................. 10 2017 101 945

(51) Int. Cl.
H04B 10/00    (2013.01)
G01S 7/481    (2006.01)
G01V 8/14     (2006.01)

(52) U.S. Cl.
CPC .............. G01S 7/4813 (2013.01); G01V 8/14 (2013.01)

(58) Field of Classification Search
USPC .................................. 398/135–139
See application file for complete search history.

(56) References Cited

U.S. PATENT DOCUMENTS

| | | | | |
|---|---|---|---|---|
| 4,326,799 A | * | 4/1982 | Keene | G01B 11/26 244/3.16 |
| 4,964,693 A | * | 10/1990 | Branan, Jr. | H04B 10/071 250/227.11 |
| 5,103,085 A | * | 4/1992 | Zimmerman | G01S 17/06 250/214 B |
| 5,455,669 A | * | 10/1995 | Wetteborn | G01S 7/4811 356/5.01 |

(Continued)

FOREIGN PATENT DOCUMENTS

DE   102013104547 A1   11/2014
WO      2016148645 A1    9/2016

*Primary Examiner* — Agustin Bello
(74) *Attorney, Agent, or Firm* — Slater Matsil, LLP

(57) ABSTRACT

A measuring arrangement having an optical transmitter and an optical receiver are disclosed. In an embodiment a measuring arrangement includes an optical transmitter configured to transmit electromagnetic measuring radiation into a transmission space, an optical receiver configured to receive measuring radiation reflected by an object in a reception space and a covering configured to reduce reception of an interference radiation by the receiver, wherein the interference radiation is measuring radiation not reflected by the object.

15 Claims, 6 Drawing Sheets

(56) References Cited

U.S. PATENT DOCUMENTS

| | | | | |
|---|---|---|---|---|
| 5,648,979 A * | 7/1997 | Mun | H01S 5/0264 | 250/214.1 |
| 5,732,101 A * | 3/1998 | Shin | H01S 5/18394 | 372/92 |
| 5,745,050 A * | 4/1998 | Nakagawa | G08G 1/16 | 180/167 |
| 5,760,390 A * | 6/1998 | Vezzalini | G01S 17/48 | 250/221 |
| 5,808,727 A * | 9/1998 | Katayama | G01S 7/4811 | 356/4.01 |
| 5,949,530 A * | 9/1999 | Wetteborn | G01C 3/08 | 356/5.01 |
| 5,974,071 A * | 10/1999 | Jiang | H01S 5/0262 | 372/50.11 |
| 6,262,800 B1 * | 7/2001 | Minor | F41G 7/008 | 244/3.13 |
| 6,265,725 B1 * | 7/2001 | Moll | F16P 3/144 | 250/559.38 |
| 6,526,080 B1 * | 2/2003 | Shin | H01S 5/0262 | 372/45.01 |
| 6,717,972 B2 * | 4/2004 | Steinle | H01S 5/183 | 372/50.1 |
| 6,835,923 B2 * | 12/2004 | Hamalainen | H03K 17/941 | 250/221 |
| 6,894,768 B2 * | 5/2005 | Caldwell | B64D 43/00 | 356/28 |
| 7,081,614 B2 * | 7/2006 | Duncan | G01D 3/08 | 250/252.1 |
| 7,286,581 B2 * | 10/2007 | Coleman | H01L 31/167 | 257/E31.108 |
| 7,301,608 B1 * | 11/2007 | Mendenhall | G01S 17/18 | 356/4.01 |
| 7,309,855 B2 * | 12/2007 | Nagasaka | G01D 5/305 | 250/231.14 |
| 7,355,179 B1 * | 4/2008 | Wood | G06T 1/00 | 250/339.11 |
| 7,486,386 B1 * | 2/2009 | Holcombe | G01S 7/497 | 356/4.01 |
| 7,489,865 B2 * | 2/2009 | Varshneya | G01S 7/481 | 398/33 |
| 7,522,291 B2 * | 4/2009 | Hays | G01N 21/47 | 356/519 |
| 7,545,485 B2 * | 6/2009 | Okada | G01S 7/4812 | 356/4.01 |
| 7,714,265 B2 * | 5/2010 | Fadell | G01J 1/4204 | 250/214 AL |
| 7,808,706 B2 * | 10/2010 | Fadel | G02B 3/0031 | 349/95 |
| 8,031,164 B2 * | 10/2011 | Herz | G06F 1/3203 | 345/102 |
| 8,081,299 B2 * | 12/2011 | Kim | G01C 3/08 | 356/3.01 |
| 8,305,561 B2 * | 11/2012 | Mori | G01C 3/08 | 356/28.5 |
| 8,675,181 B2 * | 3/2014 | Hall | G01C 3/08 | 356/5.01 |
| 8,692,983 B1 * | 4/2014 | Chapman | G01S 7/4812 | 356/28 |
| 8,829,406 B2 * | 9/2014 | Akerman | G02B 5/1842 | 250/205 |
| 8,835,202 B2 * | 9/2014 | Tseng | H01L 33/504 | 438/27 |
| 8,836,922 B1 * | 9/2014 | Pennecot | G01S 7/4816 | 356/4.01 |
| 8,987,656 B2 * | 3/2015 | Hung | G06F 3/0425 | 250/214 AL |
| 9,069,061 B1 * | 6/2015 | Harwit | G01S 7/4863 | |
| 9,237,333 B2 * | 1/2016 | Lee | H04N 13/271 | |
| 9,275,974 B2 * | 3/2016 | Kaschner | H01L 25/042 | |
| 9,525,863 B2 * | 12/2016 | Nawasra | G01S 17/42 | |
| 9,810,626 B2 * | 11/2017 | Kramer | G01D 5/30 | |
| 9,866,816 B2 * | 1/2018 | Retterath | G01S 17/18 | |
| 9,977,119 B2 * | 5/2018 | Wu | G01S 7/4817 | |
| 10,067,231 B2 * | 9/2018 | Zweigle | G01S 7/4813 | |
| 10,132,928 B2 * | 11/2018 | Eldada | G01S 17/89 | |
| 10,203,399 B2 * | 2/2019 | Retterath | G01S 17/10 | |
| 2001/0035946 A1 * | 11/2001 | Nakase | G01C 15/002 | 356/4.01 |
| 2002/0188210 A1 * | 12/2002 | Aizawa | A61B 5/02433 | 600/503 |
| 2003/0053513 A1 * | 3/2003 | Vatan | G02B 26/10 | 372/109 |
| 2003/0223756 A1 * | 12/2003 | Tatum | H04B 10/40 | 398/135 |
| 2004/0264972 A1 * | 12/2004 | Killinger | H04B 10/11 | 398/130 |
| 2005/0024625 A1 * | 2/2005 | Mori | G01S 7/4817 | 356/4.01 |
| 2005/0168720 A1 * | 8/2005 | Yamashita | G01S 7/4817 | 356/4.01 |
| 2005/0201665 A1 * | 9/2005 | Manderscheid | G02B 6/4204 | 385/14 |
| 2006/0157643 A1 * | 7/2006 | Bamji | G01S 7/4868 | 250/208.1 |
| 2006/0208193 A1 * | 9/2006 | Bodkin | G01J 3/02 | 250/353 |
| 2007/0076201 A1 * | 4/2007 | Babin | G01N 21/53 | 356/338 |
| 2007/0228262 A1 * | 10/2007 | Cantin | G08G 1/04 | 250/221 |
| 2009/0009747 A1 * | 1/2009 | Wolf | G01C 3/08 | 356/4.01 |
| 2009/0040629 A1 * | 2/2009 | Bechtel | G02B 3/005 | 359/796 |
| 2009/0123158 A1 * | 5/2009 | Ray | G01S 7/4812 | 398/140 |
| 2009/0185159 A1 * | 7/2009 | Rohner | G01S 17/89 | 356/5.01 |
| 2010/0008588 A1 * | 1/2010 | Feldkhun | G01S 17/48 | 382/206 |
| 2010/0045966 A1 * | 2/2010 | Cauquy | G01S 17/89 | 356/5.11 |
| 2010/0046802 A1 * | 2/2010 | Watanabe | G01S 17/89 | 382/106 |
| 2010/0046953 A1 * | 2/2010 | Shaw | G01S 17/88 | 398/115 |
| 2010/0086311 A1 * | 4/2010 | Shimizu | B82Y 20/00 | 398/139 |
| 2010/0128136 A1 * | 5/2010 | Belenkii | F41G 1/38 | 348/222.1 |
| 2010/0219326 A1 | 9/2010 | Klein et al. | | |
| 2010/0228517 A1 * | 9/2010 | Wike, Jr. | G01S 7/4813 | 702/149 |
| 2010/0231891 A1 * | 9/2010 | Mase | H04N 5/2352 | 356/5.01 |
| 2010/0327164 A1 * | 12/2010 | Costello | G01S 7/4813 | 250/338.1 |
| 2011/0025843 A1 * | 2/2011 | Oggier | G01S 7/4814 | 348/135 |
| 2011/0057108 A1 * | 3/2011 | Yao | H01L 31/173 | 250/338.4 |
| 2011/0086676 A1 * | 4/2011 | Choi | G02B 5/008 | 455/567 |
| 2011/0121181 A1 * | 5/2011 | Costello | G01S 7/4813 | 250/338.1 |
| 2011/0216304 A1 * | 9/2011 | Hall | G01S 17/89 | 356/4.01 |
| 2011/0268453 A1 * | 11/2011 | Fest | G01S 7/4818 | 398/129 |
| 2012/0037793 A1 * | 2/2012 | Ong | G02B 3/02 | 250/216 |
| 2012/0044476 A1 * | 2/2012 | Earhart | G01S 7/4814 | 356/4.01 |
| 2012/0132788 A1 * | 5/2012 | Findlay | G01J 5/025 | 250/208.2 |
| 2012/0132793 A1 * | 5/2012 | Campbell | H01L 27/14618 | 250/221 |

(56) References Cited

U.S. PATENT DOCUMENTS

| | | | | |
|---|---|---|---|---|
| 2012/0132806 A1* | 5/2012 | Findlay | H01L 27/14618 | 250/338.1 |
| 2012/0153153 A1* | 6/2012 | Chang | G01S 7/4815 | 250/338.1 |
| 2012/0160994 A1* | 6/2012 | Costello | G01D 11/245 | 250/221 |
| 2012/0287417 A1* | 11/2012 | Mimeault | G01S 7/4863 | 356/5.01 |
| 2012/0295665 A1* | 11/2012 | Pantfoerder | G01J 1/0407 | 455/566 |
| 2013/0044310 A1* | 2/2013 | Mimeault | G01S 7/487 | 356/5.01 |
| 2013/0265563 A1* | 10/2013 | Vogt | G01S 7/4806 | 356/4.01 |
| 2013/0266326 A1* | 10/2013 | Joseph | H01S 5/18388 | 398/130 |
| 2014/0071433 A1* | 3/2014 | Eisele | G01S 7/4816 | 356/5.01 |
| 2014/0084145 A1* | 3/2014 | Guan | G01J 1/0271 | 250/216 |
| 2014/0103199 A1* | 4/2014 | Loong | G01S 17/04 | 250/214.1 |
| 2014/0111812 A1* | 4/2014 | Baeg | G01S 7/4817 | 356/610 |
| 2014/0118493 A1* | 5/2014 | Sali | H04N 13/254 | 348/43 |
| 2014/0233942 A1* | 8/2014 | Kanter | G01S 17/26 | 398/25 |
| 2014/0252209 A1* | 9/2014 | Land | G01S 17/04 | 250/208.2 |
| 2014/0269796 A1* | 9/2014 | Geske | H01S 5/4087 | 372/34 |
| 2014/0285628 A1* | 9/2014 | Shpunt | G02B 27/1066 | 348/46 |
| 2014/0347648 A1* | 11/2014 | Roberts | G01S 17/931 | 356/4.01 |
| 2015/0016824 A1* | 1/2015 | Roberts | H04B 10/116 | 398/118 |
| 2015/0184999 A1* | 7/2015 | Stettner | G01B 11/00 | 348/46 |
| 2015/0195042 A1* | 7/2015 | Raskar | H04B 10/502 | 398/118 |
| 2015/0219763 A1 | 8/2015 | Nubling | | |
| 2015/0292948 A1* | 10/2015 | Goldring | G01N 21/255 | 356/326 |
| 2015/0301180 A1* | 10/2015 | Stettner | G01S 7/487 | 356/5.01 |
| 2016/0091364 A1* | 3/2016 | Tu | G01S 17/04 | 250/216 |
| 2016/0240721 A1* | 8/2016 | Chu | G01J 3/36 | |
| 2016/0282468 A1* | 9/2016 | Gruver | G01C 3/02 | |
| 2016/0327639 A1* | 11/2016 | Albert | F16P 3/144 | |
| 2016/0328619 A1* | 11/2016 | Yi | B60W 30/12 | |
| 2017/0219426 A1* | 8/2017 | Pacala | G01S 17/894 | |
| 2017/0289524 A1* | 10/2017 | Pacala | G02B 5/208 | |
| 2017/0372602 A1* | 12/2017 | Gilliland | G08G 1/08 | |
| 2018/0073924 A1* | 3/2018 | Steinmann | G01J 3/0256 | |
| 2018/0107221 A1* | 4/2018 | Droz | G05D 1/024 | |
| 2018/0136321 A1* | 5/2018 | Verghese | G05D 1/024 | |
| 2018/0164439 A1* | 6/2018 | Droz | G01S 17/931 | |
| 2018/0191404 A1* | 7/2018 | Berger | H04B 5/0037 | |
| 2018/0231206 A1* | 8/2018 | Hara | G01S 7/4813 | |
| 2018/0262738 A1* | 9/2018 | Kapuria | B60R 11/0247 | |
| 2018/0267169 A1* | 9/2018 | Xu | G01S 7/4863 | |
| 2018/0321360 A1* | 11/2018 | Hall | G01S 7/4811 | |
| 2018/0329065 A1* | 11/2018 | Pacala | G01S 7/4815 | |
| 2018/0329066 A1* | 11/2018 | Pacala | G01S 17/89 | |
| 2018/0372875 A1* | 12/2018 | Juelsgaard | G05D 1/024 | |
| 2019/0011556 A1* | 1/2019 | Pacala | G01S 7/497 | |
| 2019/0129030 A1* | 5/2019 | Sung | G01S 17/08 | |
| 2019/0154889 A1* | 5/2019 | McWhirter | G01S 17/931 | |
| 2019/0179028 A1* | 6/2019 | Pacala | G01S 7/4814 | |
| 2019/0250252 A1* | 8/2019 | Wong | B32B 27/283 | |
| 2019/0257922 A1* | 8/2019 | McCord | G01S 17/42 | |
| 2019/0353762 A1* | 11/2019 | Kim | G01S 17/42 | |
| 2019/0384313 A1* | 12/2019 | Toth | G01S 17/86 | |
| 2020/0033454 A1* | 1/2020 | Hong | G01S 7/4865 | |

* cited by examiner

MEASURING ARRANGEMENT HAVING AN OPTICAL TRANSMITTER AND AN OPTICAL RECEIVER

This patent application is a national phase filing under section 371 of PCT/EP2018/052209, filed Jan. 30, 2018, which claims the priority of German patent application 102017101945.6, filed Feb. 1, 2017, each of which is incorporated herein by reference in its entirety.

TECHNICAL FIELD

The present invention relates to a measuring arrangement having an optical transmitter and an optical receiver.

BACKGROUND

In the state of the art, an optical transmitter and an optical receiver are provided side by side on a carrier. In order to reduce interference radiation which is a measuring radiation not reflected by the object, a housing cap is provided between the object and the transmitter and receiver arrangement, the housing cap having two apertures. One aperture is arranged above the transmitter and a second aperture above the receiver. Reception of interference radiation may in particular be reduced by means of the aperture above the receiver.

SUMMARY OF THE INVENTION

Embodiments provide an improved measuring arrangement comprising an optical transmitter and an optical receiver.

An advantage of the proposed measuring arrangement may consist in providing a further reduction of interference radiation. For this purpose, means are provided that reduce reception of interference radiation that represents measuring radiation not reflected by the object.

In a first embodiment, a covering is provided for this purpose, the covering being at least partially arranged in the transmission space and in the reception space between transmitter and receiver and the object to be measured. The covering comprises a passage area that is transparent for the measuring radiation and for the measuring radiation reflected by the object. The passage area comprises the transmission space and the reception space. In addition, the passage area is configured as a continuous surface. The transmitter and the receiver are arranged very closely to each other so that one single passage area may be used. By means of this, a simplified design is achieved which additionally allows for a reduction in the reception of interference radiation.

In a second embodiment, the transmitter is arranged in the reception space, the transmitter covering a part of the reception space against a reception of reflected measuring radiation. In order to reduce interference radiation, the reception surface of the receiver comprises an inactive surface area. In the inactive surface area, the received reflected measuring radiation is not evaluated. The inactive surface area comprises at least a ring shape arranged around the partial surface shadowed by the transmitter on the reception surface. The ring shape may be embodied as a continuous surface having a ring shape in the outer area. The surface may comprise the reception surface shadowed by the transmitter.

By arranging the transmitter above the receiver in the reception space, construction space is saved. As a result, the arrangement can be provided requiring only little space. Furthermore, an increase of interference radiation due to arranging the transmitter in the reception space may be compensated for or at least reduced by providing the inactive surface area. The inactive surface area is embodied in such a way that at least a part of the interference radiation caused by the arrangement of the transmitter in the reception space is not determined and evaluated by the receiver. The inactive surface area may be realized by not providing a reception surface in the inactive surface area or by covering the provided reception surface or and by protecting it against reception of reflected measuring radiation. Moreover, the inactive surface area may be realized by the fact that a provided reception surface is not active and not used for reception of reflected measuring radiation.

In a third embodiment, a reception surface of the receiver provided for reception of a reflected measuring radiation is divided up into at least two partial surfaces. In this context, at least one partial surface may be configured in such a way that it may be activated and/or deactivated. In an activated state, the partial surface is configured to detect the reflected measuring radiation. In a deactivated state, the partial surface is configured to not detect the reflected measuring radiation. In this way, the receiver with the two partial surfaces may be put to individual use.

Depending on the chosen embodiment, it may be advantageous to operate both partial surfaces in an active state and to detect the reflected measuring radiation. In another embodiment, it may be advantageous to operate the first or second partial surface in the deactivated state and to not detect any reflected measuring radiation via the first or, respectively, second partial surface. This may be particularly advantageous when interference radiation or a high portion of interference radiation is detected via one of the two partial surfaces. In this manner, the receiver may be individually set to a predetermined measuring situation. For example, the measuring situation may be influenced by the type of object or by the distance of the object with regard to the measuring arrangement.

It may furthermore be advantageous to operate the first as well as the second partial surface in the deactivated state, particularly if a high portion of interference radiation is received on both partial surfaces and as a result, the reflected measuring radiation at issue may no longer be detected to a sufficient extent.

In a variation of the first embodiment, a reception surface of the receiver is completely located in the reception space that abuts on the receiver via the passage area. This allows for a compact design of the reception surface. Moreover, the existing reception surface is used efficiently because the entire reception surface is located in the reception space that is determined by the passage area.

In a further first embodiment, the reception surface is at least partially configured as a circle. Due to the partial circle shape, a precise limitation of the reception surface may be realized on a reception space that has a partial circle shape in cross section. In this context, the passage area is embodied in such a way that the reception space on the reception surface of the receiver has at least a partial circle shape. For this, the passage area has at least a partial circle shape. In a simple embodiment, the passage area may have a circle shape. For example, the reception surface may have a half-circle shape. By means of this, a compact design requiring limited space may be realized.

In a further first embodiment, the transmitter and/or the receiver comprise an optical element, in particular a lens for an improved guiding of radiation. By means of at least one optical element having an improved guiding of radiation, an improved guiding of the transmitted measuring radiation and/or of the reflected and received measuring radiation may be achieved. Thereby, the transmitter as well as the reception surface of the receiver may be realized in a smaller area with the same measuring performance. In addition, the design of the measuring arrangement may be realized requiring limited space and with smaller design.

The optical element may be realized as an individual lens for the transmitter and/or the receiver. In addition, an optical element may be provided for the transmitter as well as for the receiver. In this context, the optical element extends over the transmission space of the transmitter as well as over the reception space of the receiver. Depending on the chosen embodiment, the optical element, particularly the lens or the lenses, may be embodied as a molded optical element produced from a molding material. Depending on the chosen embodiment, a transfer-molded element may be used as an optical element having low optical guiding capacity but providing protection of the transmitter and/or the receiver.

In a further first embodiment, the reception surface of the receiver has a U-shape with two legs and a connecting region. In this arrangement, it is advantageous for a low space requirement if the transmitter is at least partially or fully arranged in a region between the two legs. In addition, in this embodiment it may be advantageous to configure an outer contour of the reception surface abutting on an edge area of the reception space as a circle shape or in the shape of the limiting surface of the reception space. Thereby, the available surface is efficiently used for the transmitter and the reception space.

Depending on the chosen embodiment, the reception surface may be formed of a plurality of separate partial reception surfaces. The partial reception surfaces, too, may have a U-shape and at least partly receive the transmitter between the two legs of the U-shape. The partial reception surfaces may be square or, respectively, rectangular and they may in part protrude laterally over the reception space. It is true that thereby a part of the reception surface is provided without receiving functionality, however, the design of the reception surface is simple and inexpensive.

In a further second embodiment, no reception surface is provided in the inactive surface area of the reception surface. As a result, the actual reception surface is limited to a surface area that is actually provided for receiving a measuring radiation.

In a further second embodiment, the reception surface is provided in the inactive surface area, however, it is covered and protected against reception of radiation. In this manner, the inactive surface area of the reception surface is protected against reception of interference radiation, but also against reception of a measuring radiation. The covered area of the reception surface is particularly configured with so large a size or, respectively, in a way that low or no interference radiation is received.

In a further second embodiment, the reception surface is provided in the inactive surface area, however, it is deactivated. This may, e.g., be realized by a segmented reception surface, wherein a segment of the reception surface forms the inactive surface area and said segment is deactivated and not used for receiving any measuring radiation.

In a further second embodiment, a lens is provided in the transmission space of the transmitter in order to focus the radiation on a desired target area. By means of this, an improved measuring evaluation is achieved.

In a further second embodiment, the lens is formed from a molding material, wherein the lens covers the transmitter and at least the receiver. In this embodiment, the receiver may be provided with a lens, as well. Configuring the lens from a molding material is simple and inexpensive in production. In addition, the lens for the transmitter as well as the lens for the receiver may be produced in a simple manner in one working step.

In a further second embodiment, the lens for the transmitter is held in a retainer. The retainer is fixed onto the transmitter and/or the receiver and positions the lens at a predetermined distance to the transmitter. The retainer surrounds and covers the transmitter. In addition, the retainer holds the lens laterally so that interference radiation generated by the lens is blocked by the retainer from striking the reception surface of the receiver. By means of this, the interference radiation for the receiver may be reduced.

In a further second embodiment, the transmitter is arranged on the receiver or on the reception surface of the receiver. Thereby, a simple design of low height is realized.

In a further second embodiment, the receiver comprises a reception surface arranged on an evaluation chip. The reception surface comprises a smaller surface than the evaluation chip. This provides a simple and compact design of the receiver.

In a further second embodiment, a covering is provided with a passage area. The passage area is transparent for measuring radiation and for reflected measuring radiation. The passage area comprises or, respectively, defines the transmitter space and the reception space. The passage area is embodied as a continuous surface. By means of the covering, a further reduction of the interference radiation may be achieved by means of a compact design of the arrangement.

In a further third embodiment, the partial surfaces have a striped shape. This embodiment is particularly advantageous if the transmitter is arranged laterally to the receiver. For example, two or more stripe-shaped partial surfaces may be provided. The partial surfaces may have same lengths and widths. In addition, the stripe-shaped partial surfaces may have differing lengths and/or differing widths, depending on the chosen embodiment. Instead of stripe-shaped partial surfaces, square or circular partial surfaces may be provided, as well. Due to the possibility of activating or deactivating the partial surfaces, a surface shape of the active partial surfaces of the reception surface adapted to the measuring situation may be realized. By means of this, reception of interference radiation may be reduced or, respectively, minimized.

In a further third embodiment, the partial surfaces have a ring-shape wherein the transmitter is arranged in the reception space above the reception surface. For example, the transmitter is arranged centrally above the reception surface. A region of the reception space shadowed by the transmitter may be covered, deactivated or free from a reception surface. Additionally, a first partial surface may be arranged around the shadowed area of the reception surface in a ring-shaped manner. The at least one further partial surface is embodied in a ring shape around the first partial surface or, respectively, the first partial surfaces. Depending on the measuring situation, at least one of the ring-shaped partial surfaces may be deactivated and thereby reduce reception of the interference radiation.

The ring-shaped configuration of the partial surface may, e.g., be realized in the shape of circular ring surfaces. In this context, the innermost partial surface may be configured as a circular surface, as well, depending on the chosen embodiment.

In a further embodiment, the ring-shaped partial surfaces have the shape of closed striped rings comprising a plurality of striped sections abutting on each other in a rectilinear manner. One striped ring may have at least three striped sections, in particular four striped sections. In this embodiment, an innermost partial surface may comprise a triangle surface, a rectangular surface or a polyangular surface.

In a variation of the third embodiment, the reception surface is embodied as a segmented photodiode or in the shape of a plurality of photodiodes. By means of the segmented photodiode or by means of the plurality of photodiodes, the proposed partial surfaces may be realized simply and inexpensively. In addition, the partial surface of the reception surface may be evaluated independently from each other.

BRIEF DESCRIPTION OF THE DRAWINGS

The above-described properties, features and advantages of the present invention as well as the manner in which they are achieved will become clearer in context with the following description of embodiment examples which are described in more detail in conjunction with the drawings, in which.

DETAILED DESCRIPTION OF ILLUSTRATIVE EMBODIMENTS

Figure 1:
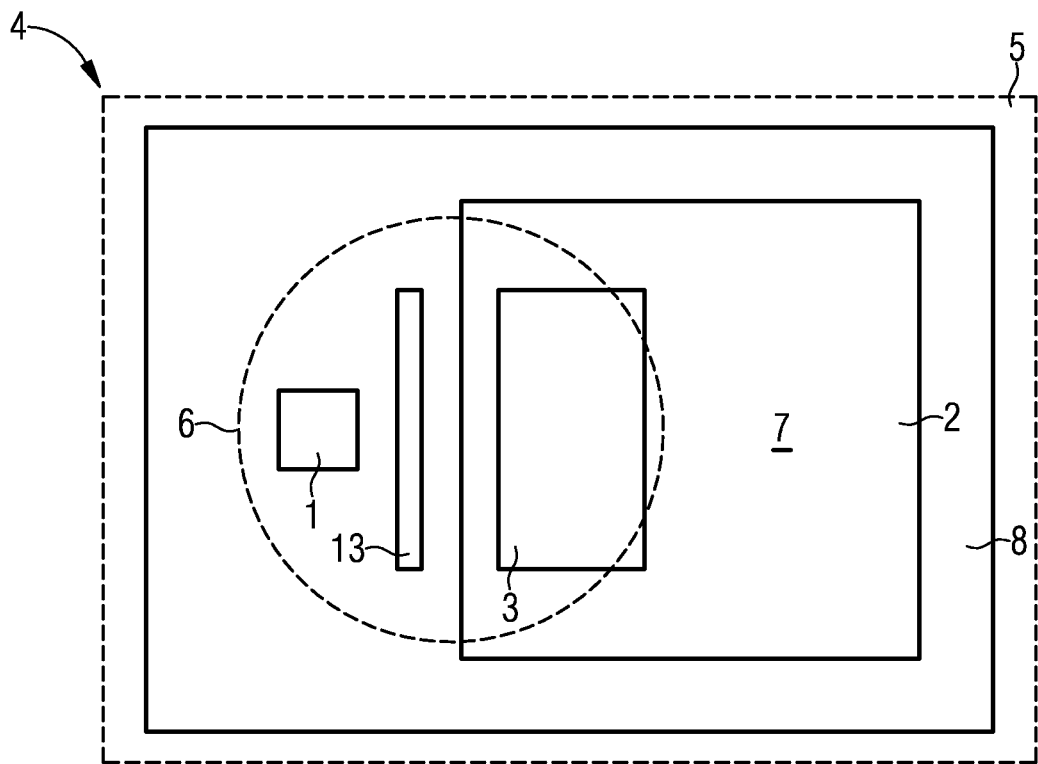
FIG. 1 shows a schematic top view of a first embodiment of a measuring arrangement having a transmitter and a receiver.

In a schematic view, FIG. 1 depicts a top view of a first embodiment of a measuring arrangement 4 comprising a transmitter 1 and a receiver 2. A part of an upper side of the receiver 2 is embodied as a reception surface 3. A covering 5 is arranged above the measuring arrangement 4, wherein the covering 5 is transparent. The covering 5 comprises a transparent passage area 6. The passage area 6 is transparent for a measuring radiation of the transmitter and for a measuring radiation received by the reception surface 3 and reflected at an object. The covering 5 may, for example, be formed from a non-transparent material and the passage area 6 may have the form of an aperture. Furthermore, the covering 5 may entirely consist of a transparent material and the region of the covering 5 may be covered by a non-transparent layer outside of the passage area 6. The covering 5 may, e.g., be formed from sapphire or glass. The covering 5 may have the shape of a plate. The covering 5 may be arranged above the measuring arrangement 4 in such a way that electromagnetic radiation of the transmitter 1 may be radiated through the passage area 6 to an object to be measured. The passage area 6 is arranged relative to the reception surface 3 in such a way that a measuring radiation reflected by the object to be measured is radiated back to the reception surface 3 via the passage area 6. It is a function of the covering 5 with the passage area 6 to block interference radiation that is measuring radiation not reflected by the object. The covering 5 thus provides that as much reflected measuring radiation as possible strikes the reception surface 3 and as little interference radiation as possible strikes the reception surface 3.

The transmitter 1 is configured to transmit electromagnetic radiation, in particular infrared radiation, visible light or ultra-violet radiation. The transmitter 1 may, e.g., be configured as a light-emitting diode or as a laser diode being a semiconductor chip. The receiver 2 comprises an evaluation chip 7 wherein the evaluation chip 7 comprises electric and/or electronic circuits for evaluating the reflected measuring radiation received by the reception surface 3. The reception surface 3 may, e.g., be embodied as a photodiode. The transmitter 1 and the receiver 2 with the reception surface 3 may be in a close side-by-side arrangement with regard to each other. The reception surface 3, the passage area 6 and the transmitter 1 are embodied in such a way that the passage area 6 is utilized in an ideal manner.

Figure 2:
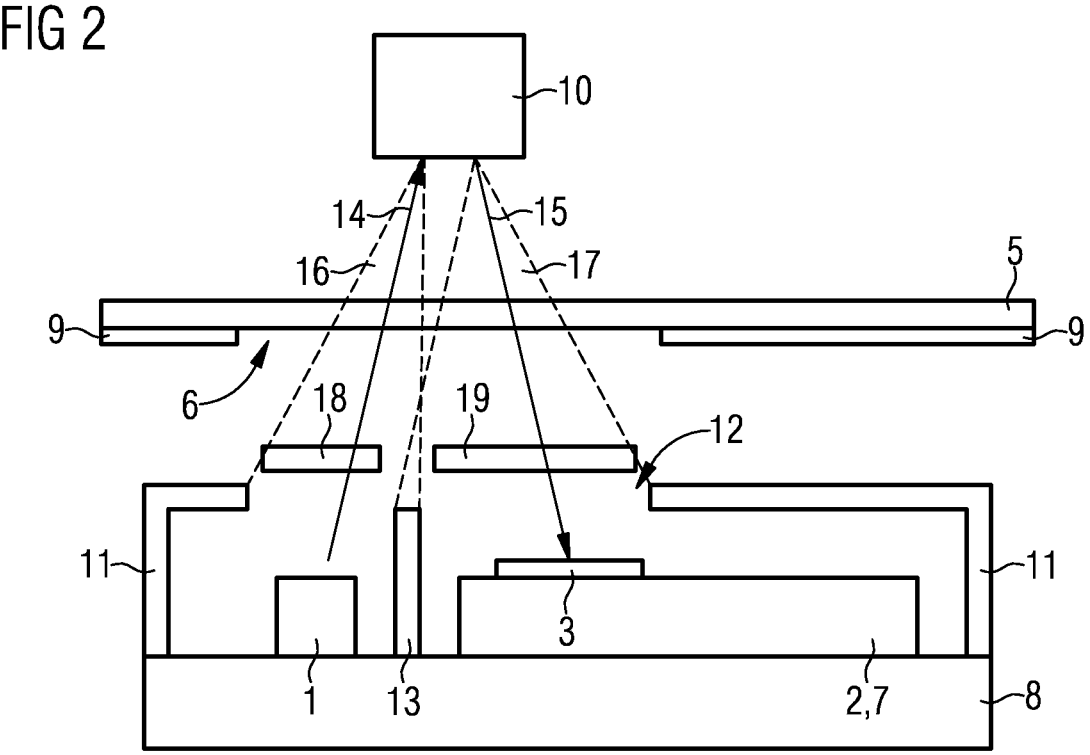
FIG. 2 depicts a schematic cross-sectional view through the first embodiment.

FIG. 2 shows a schematic lateral view of the arrangement of FIG. 1. The transmitter 1 and the receiver 2 are arranged on a carrier 8. The covering 5 is configured as a transparent plate on the bottom side of which a non-transparent layer 9 is arranged. The layer 9 comprises an aperture as a passage area 6. Above the covering 5, an object 10 to be measured is schematically depicted. In the shown embodiment, the measuring arrangement 4 comprises a housing cap 11 that is non-transparent for electromagnetic radiation, particularly for the measuring radiation. The housing cap 11 is connected to the carrier 8 and protects the transmitter 1 and the receiver 2 against environmental damage. The housing cap 11 comprises a recess 12 that is formed above the transmitter 1 and above the reception surface 3. The recess 12 may be sealed with a transparent material. In addition, a housing wall 13 is formed between the transmitter 1 and the receiver 2. The housing wall 13 extends from an upper side of the carrier 8 up to a height above the transmitter 1 and the receiver 2. In addition, the housing wall 13 extends at least over a longitudinal side of the transmitter 1. In this manner, direct irradiation of measuring radiation onto the reception surface 3 without reflection at the object 10 is avoided.

The transmitter 1 is configured to transmit measuring radiation 14 in the direction of the object 10 to be measured through the recess 12 and through the passage area 6. The object 10 reflects at least a part of the measuring radiation 14 as reflected measuring radiation back through the passage area 6 and the recess 12 onto the reception surface 3 of the receiver 2. The evaluation chip 7 is configured to detect reception of the reflected measuring radiation 15 in the reception surface 3 and to evaluate it.

Depending on the chosen embodiment, the housing cap 11 may be formed from a transparent material and be entirely arranged above the measuring arrangement 4 with the transmitter 1 and the receiver 2 in a closed form. In this embodiment, the transparent area of the recess 12 is realized by the housing cap 11 having a non-transparent layer. The non-transparent layer has a recess corresponding to the shape of the recess 12.

The transmitter 1 transmits the measuring radiation 14 in a transmission space 16. In the depicted embodiment, the transmission space 16 is determined by the housing wall 13 and the recess 12. At the same time, a reception space 17 is formed via which measuring radiation 15 reflected from the object 10 is radiated back to the reception surface 3. The reception space 17 is determined by the housing wall 13 and the recess 12. The transmission space 16 as well as the reception space 17 are formed in such a way that the object 10 is arranged in the transmission space 16 or, respectively, in the reception space 17.

Depending on the chosen embodiment, a first optics 18 may be arranged above the transmitter 1 and/or a second optics 19 above the receiver 2 in order to achieve an improved beam formation. The first and second optics 18, 19 may, e.g., be embodied as individual lenses and be arranged in or above the recess 12. Depending on the chosen embodiment, the first and second optics 18, 19 may be realized as a shared optics, in particular as a shared lens. The optics 18, 19 may be formed from a molding material. In addition, it is conceivable that instead of optics a cover layer without a lens function is formed in the recess 12 or, respectively, on the housing cap 11. The cover layer seals the recess 12 and protects transmitter 1 and receiver 2 against environmental damage.

Figure 3:
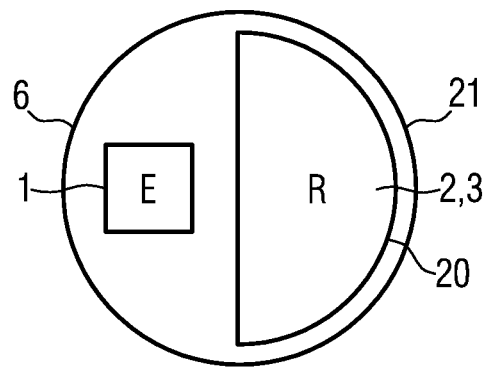
FIG. 3 depicts a schematic view of a receiver, wherein the side contour of the reception surface has a partial circle shape.
Figure 4:
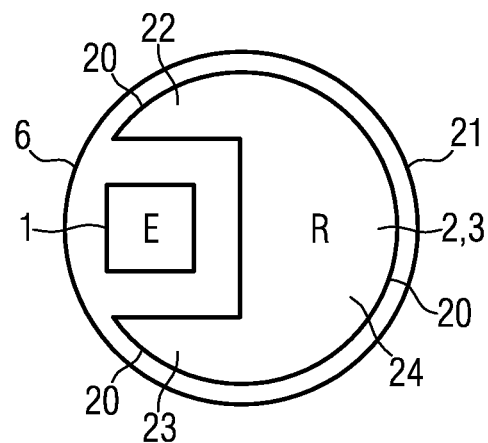
FIG. 4 shows a schematic view of a receiver having a U-shaped reception surface.
Figure 5:
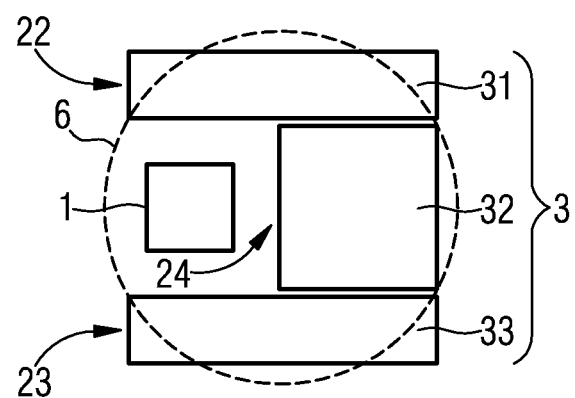
FIG. 5 depicts a further embodiment of a receiver having a plurality of reception surfaces arranged in U-shape.

FIGS. 3 to 5 are schematic depictions of optimized planar embodiments of the transmitter 1 and the receiver 2. In this context, only the transparent passage area 6 and the planar embodiment of transmitter 1 and the reception surface 3 are schematically shown.

FIG. 3 shows a circle-shaped passage area 6 with a transmitter 1. The transmitter 1 has a smaller surface than the reception surface 3. The reception surface 3 is in this embodiment formed as a partial circle surface. As a result, a side contour 20 of the reception surface 3 has an approximately similar or identical shape as the limiting contour 21 of the passage area 6. In the depicted embodiment, the reception surface 3 has a half-circle shape. Depending on the chosen embodiment, the reception surface 3 may also comprise a smaller part than a half-circle surface or a larger part than the half-circle surface.

Further utilization of the surface determined by the passage area 6 and available for measuring is shown in FIG. 4. In this embodiment, the reception surface 3 has a U-shape. The reception surface 3 comprises two legs 22, 23 that are connected to each other via a connecting surface 24. The transmitter 1 is arranged between the legs 22, 23 of the reception surface 3. In this embodiment, as well, the reception surface 3 has a partly circle-shaped side contour 20. The side contour 20 thereby extends over more than a half-circle surface and, e.g., up to almost a three-quarter-circle shape. The transmitter 1 has a basic surface that is configured as a square or as a rectangle. Depending on the chosen embodiment, the transmitter 1 may also have a circular base shape.

An advantage of the described arrangement is that as much surface as possible of the reception space is covered by the reception surface 3. The reception space is determined by the size and shape of the passage area 6. Depending on the chosen embodiment, in the embodiments of FIGS. 3 and 4 the side contours 20 of the reception surface 3 may be formed independently from the circle shape of the passage area 6. For example, in both embodiments the reception surface 3 may laterally protrude over the passage area 6 and thus over the reception space and the reception surface 3 may be rectangular or have a square outer contour. Thus, in these embodiments the reception surface may at least partly have a rectilinear or partially jagged shape.

FIG. 5 shows a further embodiment for an inexpensive and efficient covering of the reception space having a reception surface 3. In this embodiment, the reception surface 3 has the shape of three partial reception surfaces 31, 32, 33. The first and third partial reception surface 31, 33 are rectangular and form a first or, respectively a second leg 22, 23 of a U-shape. The second partial reception surface 32 is rectangular, as well, and arranged between two ends of the first and third partial reception surface 31, 33. The second partial reception surface 32 forms a connecting surface 24 of the U-shape. Depending on the chosen embodiment, the second partial reception surface 32 may be square. Between the first and the third partial reception surface 31, 33, a transmitter 1 is arranged. By means of the depicted embodiment comprising a plurality of partial reception surfaces 31, 32, 33, an inexpensive and efficient covering of the reception space may be realized. For example, the partial reception surfaces 31, 32, 33 may be three photodiodes. In addition, depending on the chosen embodiment, one single segmented photodiode may be used in order to depict the first, second and third partial reception surface 31, 32, 33.

Due to an adjusted sensor geometry, the reception surface may be used for receiving the reflected measuring radiation in an improved manner. In particular, the measuring arrangement is configured to transmit and receive infrared signals. Due to the reception surface being larger relative to the available passage are 6 or, respectively, the reception space 17 defined thereby, a higher degree of sensitivity is achieved. Ideally, the surface of the transmitter 1 and the reception surface 3 of the receiver 2 cover the entire reception space 17.

Figure 6:
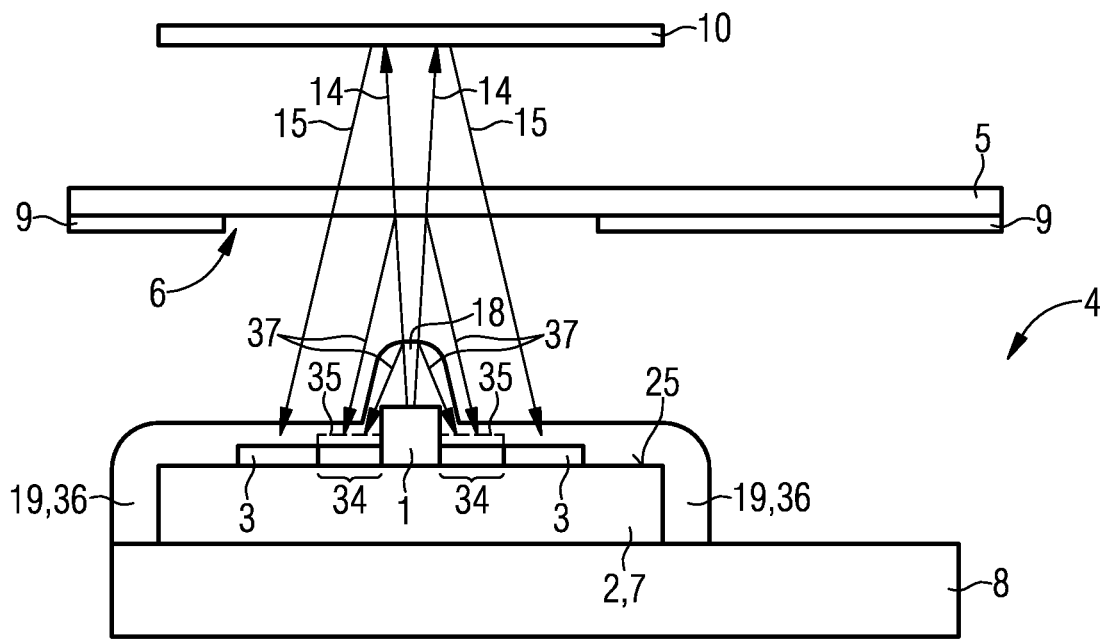
FIG. 6 shows a schematic view of a cross section through a second embodiment of a measuring arrangement with a transmitter and a receiver, wherein the transmitter is arranged in the reception space of the receiver.

FIGS. 6 to 9 show embodiments of a second measuring arrangement in which the transmitter 1 is arranged in the reception space 17. FIG. 6 shows a measuring arrangement 4 having a receiver 2 arranged on a carrier 8. On an upper side 25 of the receiver 2, a reception surface 3 is formed. In addition, a transmitter 1 is arranged on or above the upper side 25 of the receiver 2. In the depicted embodiment, the transmitter 1 is directly arranged on the upper side 25 of the receiver 2, i.e., on the upper side of the evaluation chip 7. The reception surface 3 is formed around the transmitter 1 in a ring-shaped manner. Between the transmitter 1 and the reception surface 3, an inactive reception surface 34 is formed around the transmitter 1 in a ring-shaped manner.

The inactive reception surface 34 is, e.g., realized by not providing a reception surface 3, i.e., no photodiode. In a further embodiment, the inactive reception surface 34 may be realized by a non-transparent cover covering the reception surface 3 in the area of the inactive reception surface 34. Furthermore, the inactive reception surface 34 may be realized by a sensor cover 35 covering the reception surface. The sensor cover is shown as a dotted line in FIG. 6. In a further embodiment, the inactive reception surface 34 may be realized by the reception surface 3 being deactivated in the area of the inactive reception surface 34 and not being used for evaluating the received reflected measuring radiation. The inactive reception surface 34 arranged in a ring-shape around the transmitter 1 has the advantage that less interference radiation is received by the reception surface 3. An area adjacent to the transmitter 1 shows an increased interference radiation that is not reflected measuring radiation.

Above the transmitter 1 and the receiver 2, a covering 5 having a non-transparent layer 9 is provided. The non-transparent layer 9 comprises an aperture forming a passage area 6. The covering 5 consists of a material transparent for the measuring radiation and reflected measuring radiation. The non-transparent layer 9 consists of a material non-transparent for the measuring radiation and reflected measuring radiation. The covering 5 may, e.g., consist of glass, sapphire or plastic. Above the covering 5, the object 10 to be measured by means of the measuring radiation is schematically shown. The measuring radiation 14 radiated by the transmitter 1 may be reflected as an interference radiation 37, e.g., at a boundary surface of a first optics 18. In addition, the measuring radiation 14 may be reflected as an interference radiation 37 at the covering 5. The interference radiation 37 is thus reflected back to the transmitter 1 or, respectively, the receiver 2 in a narrow angle with regard to the direction of radiation of the measuring radiation 14. As a result, the interference radiation 37 either directly strikes the transmitter 1 or the adjacent areas of the receiver 2. The adjacent areas are formed as inactive reception surface 34 in order to reduce or, respectively, to prevent reception of interference radiation at the reception surface 3.

The inactive reception surface 34 is formed in such a way that measuring radiation 15 which is reflected back from the object 10 in the direction of the reception surface 3 of the receiver 2 actually strikes an active reception surface 3 or, respectively, the reception surface 3. Depending on the chosen embodiment, the inactive reception surface 34 and the reception surface 3 or, respectively, the entire receiver 2 may be covered with a protective layer 36. The protective layer 36 may at the same time have an optical guiding function for the reflected measuring radiation 15. In addition, the first optics 18 and the protective layer 36 or, respectively, the second optics 19 may be formed as a one-piece optics, particularly from a mold material.

Figure 7:
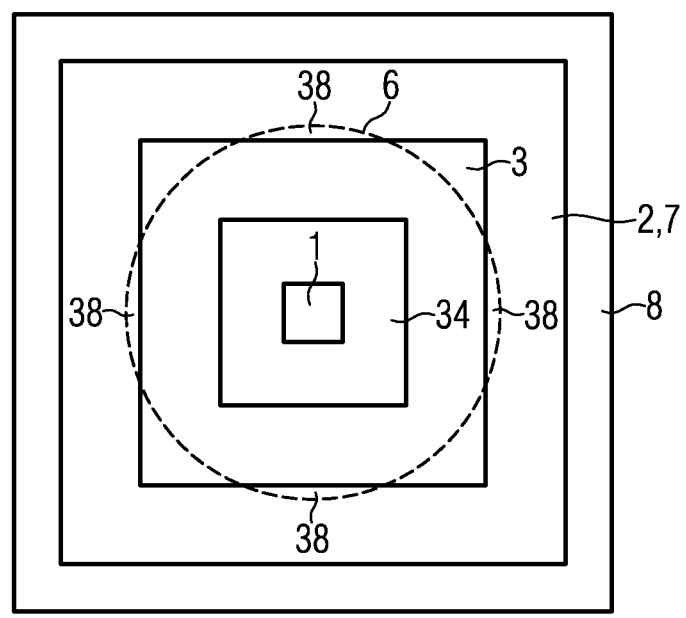
FIG. 7 depicts a top view of a second measuring arrangement.

FIG. 7 shows a schematic top view of the arrangement of FIG. 6. In this context, the covering 5 is depicted transparently and the shape of the passage area 6 is indicated by a dashed line. In the depicted embodiment, the transmitter 1 has a rectangular base surface. Likewise, the inactive reception surface 34 has a ring shape comprising a rectangular outer contour and a rectangular inner contour. The inactive reception surface 34 may have a rectangular shape over which or on which the transmitter 1 is arranged. Moreover, the reception surface 3 has a ring shape with a rectangular outer contour and a rectangular inner contour. Depending on the chosen embodiment, the reception surface 3 may also be ring-shaped surface. Likewise, the inactive reception surface 34 may have a ring-shaped surface. For example, the inactive reception surface 34 may be embodied as a circular disc, above or on which the transmitter 1 is arranged. Moreover, the transmitter 1 may have a circle shape as its base shape.

By stacking transmitter and receiver on top of each other as well as by preferably bundling the measuring radiation 14 by means of a first optics 18, the measuring arrangement may be reduced with regard to its planar expansion. A shadowed area of the transmitter 1 on the reception surface 3 may be reduced by correspondingly forming the size and/or the shape of the inactive reception surface 34. In addition, the surface areas 38 of the reception area not covered by the reception surface 3 may be used for arranging further sensors.

Figure 8:
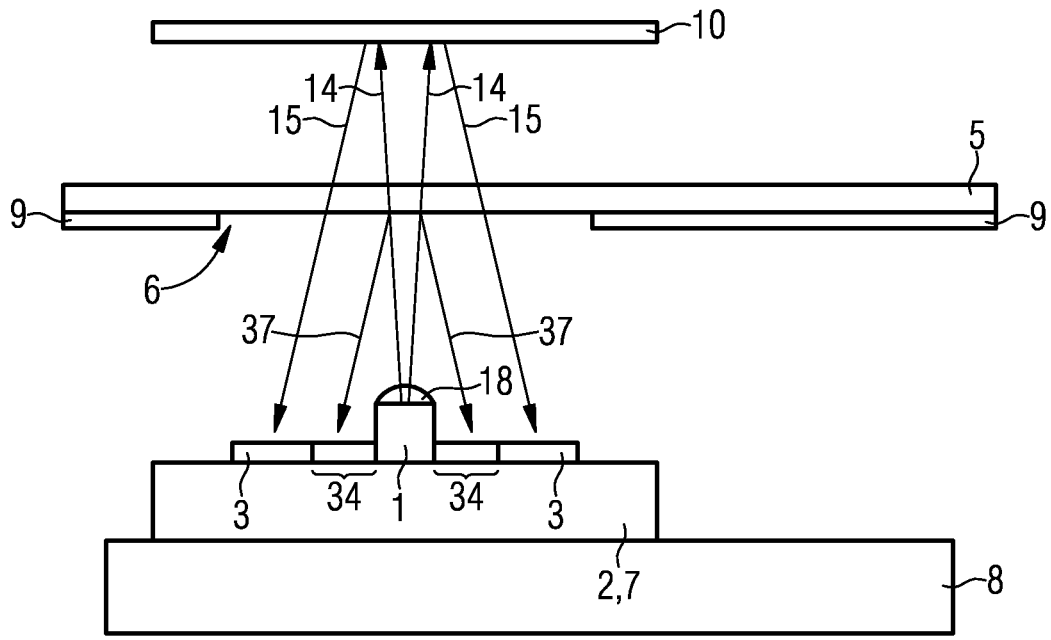
FIG. 8 shows a cross-sectional view through a further embodiment of the second measuring arrangement.

In a schematic cross-section, FIG. 8 shows another example for the second embodiment according to FIG. 6; however, in this embodiment the first optics 18 is, e.g., directly arranged on the transmitter 1 as a lens. Due to the geometric limitation of the first optics 18 on the upper side of the transmitter 1, an interference radiation 37 that may strike the reception surface 3 is reduced.

Figure 9:
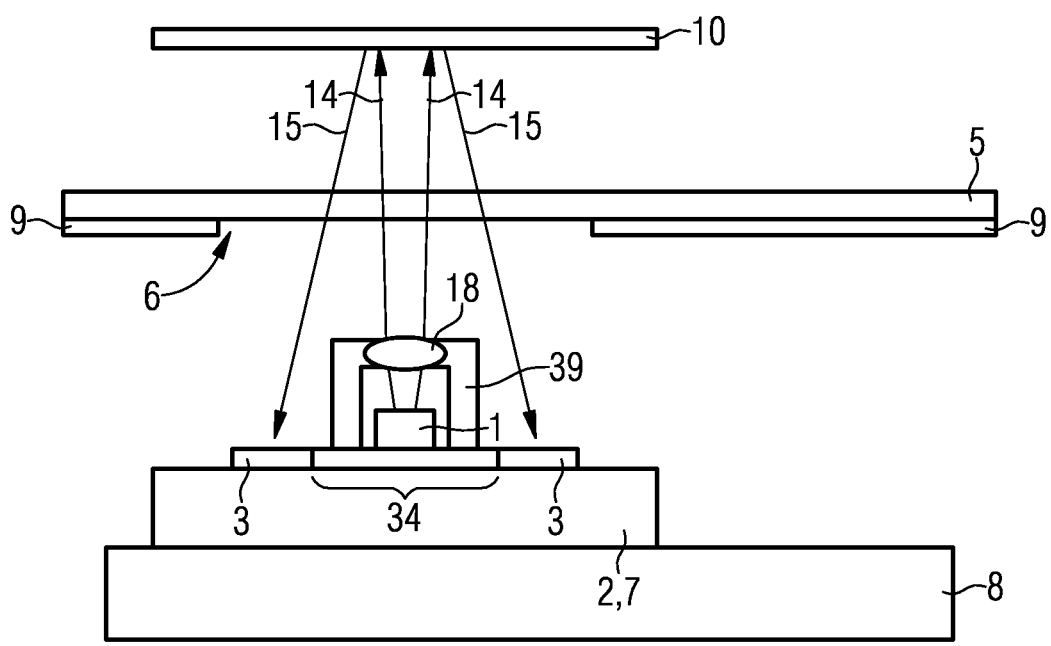
FIG. 9 shows a cross-sectional view through a further embodiment of the second measuring arrangement.

FIG. 9 shows another variant of the second embodiment of the measuring arrangement of FIG. 6 in which the interference radiation 37 may further be reduced. For this purpose, a retainer 39 is provided for the first optics 18. The retainer 39 is in this embodiment formed as a housing that covers the transmitter 1 and positions the first optics 18 in the direction of radiation of the measuring radiation 14 above the transmitter 1. The retainer 39 surrounds the transmitter 1 and is arranged on the inactive reception surface 34. The retainer 39 is positioned in the first optics 18 that is, e.g., a lens at a predetermined distance in the direction of radiation of the measuring radiation 14 above the transmitter 1. As a result, no interference radiation of the first optics 18 reaches the reception surface 3. Moreover, in this embodiment the transmitter 1 is arranged on the inactive reception surface 34, as well.

Depending on the chosen embodiment, the inactive reception surface 34 may also be realized by not using a part of the reception surface 34 for evaluating the measuring signal. For example, the reception surface 3 may be a photodiode comprising segmented areas. Said segmented areas may also be separate photodiodes. As a result, an inner area of the reception surface 3 may be formed as a first segmented area that is an inactive reception surface 34 and is not used for evaluating the reflected measuring radiation 15.

The transmitter 1 may be configured as a highly bundled light source, in particular as a laser diode such as VCSEL. Furthermore, additional optics such as a lens in the housing cap or a mold lens directly arranged on the carrier may achieve further optimization or focusing of the measuring radiation. Strong bundling of the measuring radiation of the transmitter is advantageous in order to reduce an interference radiation. The carrier 8 may comprise a multi-layer laminate, e.g., made of FR4. In this context, the transmitter 1 may at first be charged to the multi-layer laminate. Subsequently, the receiver 2 may be mounted onto the carrier 8. Then, the transmitting and receiving unit may be deposited on a reflector. For mechanical protection, a cap may be applied to the substrate. The cap may at least comprise a lens for the transmitter and/or a second lens for the receiver.

Figure 10:
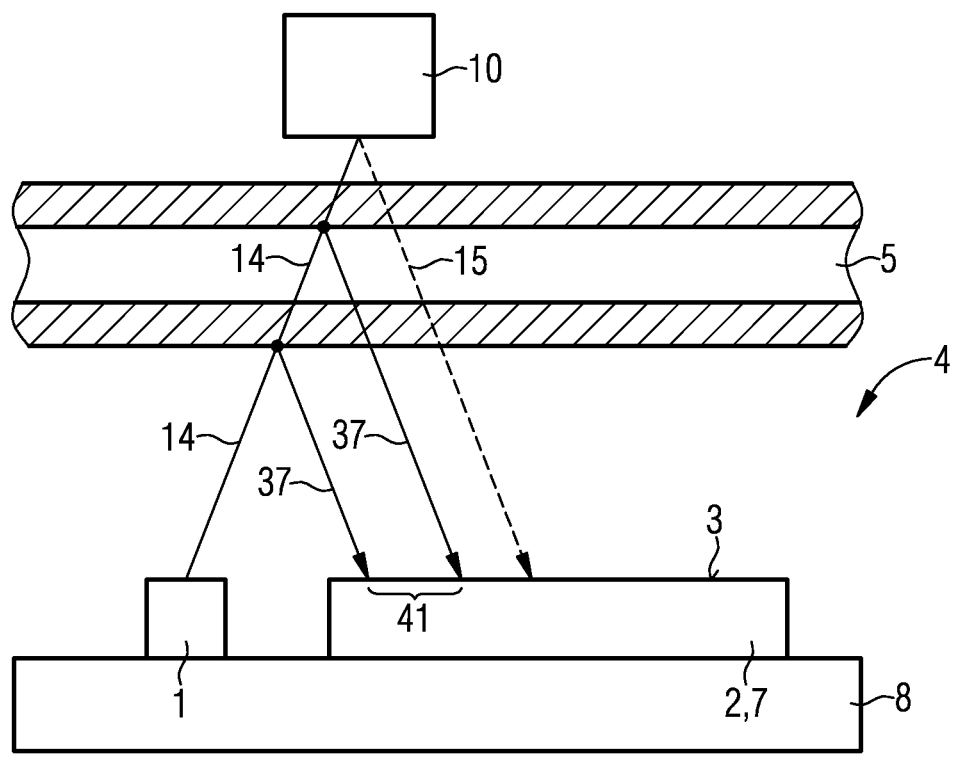
FIG. 10 depicts a schematic view of a third measuring arrangement.

FIGS. 10 to 13 show embodiments of a third measuring arrangement or, respectively, reception surfaces of a receiver of the third measuring arrangement. FIG. 10 show a schematic lateral view of a transmitter 1 arranged on a carrier 8. Beside the transmitter 1, a receiver 2 is arranged on the carrier 8 at a predetermined distance to the transmitter 1. The receiver 2 comprises a reception surface 3 on an upper side of the evaluation chip 7. Above the measuring arrangement 4, a covering 5 is arranged. The transmitter 1 transmits measuring radiation 14 in the direction of an object 10 to be measured which is arranged above the covering 5. The measuring radiation 14 may be reflected on the bottom side and on the upper side of the covering 5 and guided in the direction of the reception surface 3 as interference radiation 37. Thus, in a first area 41 of the reception surface 3, interference radiation 37 is received. Reflected measuring radiation 15 laterally strikes the first area 41 of the reception surface 3.

Figure 11:
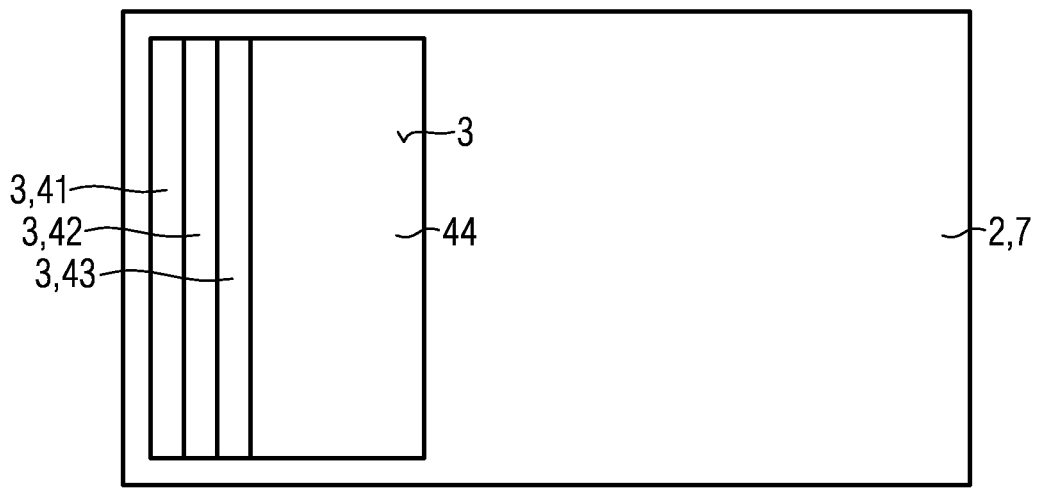
FIG. 11 depicts a schematic top view of a first embodiment of the receiver having segmented reception surfaces.

FIG. 11 is a schematic top view of the reception surface 3 of the receiver 2 of FIG. 10. The reception surface 3 comprises four strip-like segments 41, 42, 43, 44. The four segments 41, 42, 43, 44, e.g., form four reception areas of a photodiode. By means of forming the photodiode 3 with segments, depending on the chosen evaluation the four areas 41, 42, 43, 44 may be used independently from one another by the evaluation chip 7 to evaluate the received reflected measuring radiation 15. Thus, depending on the respective measuring situation, at least one of the areas or several areas, particularly all areas 41, 42, 43, 44, may not be taken into account during detection of the reflected measuring radiation 15. In this manner, an individual adjustment of the evaluation situation of the segmented areas 41, 42, 43, 44 may be realized by means of the evaluation chip 7. The four segmented areas 41, 42, 43, 44 may also be formed as four separate photodiodes.

Figure 12:
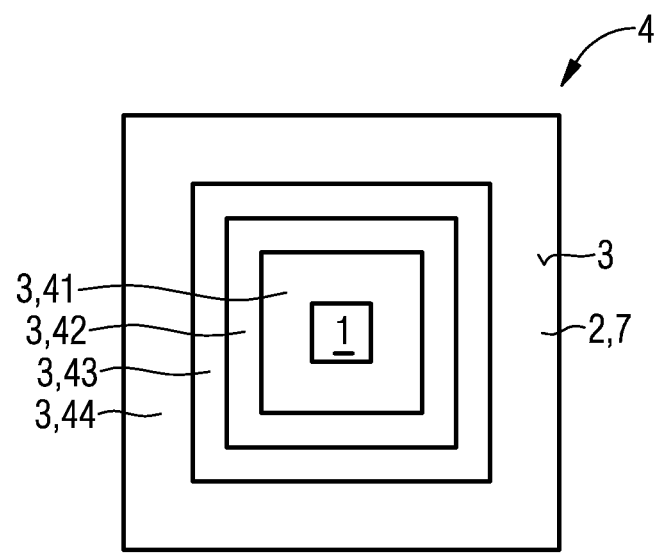
FIG. 12 shows a schematic top view of a further embodiment of the receiver having stripe-shaped circumferential reception surfaces.

FIG. 12 shows a schematic top view of a further embodiment of a measuring arrangement 4 with a receiver 2 on which a transmitter 1 is arranged. As a result, this arrangement of the transmitter 1 and of the receiver 2 essentially corresponds to the second measuring arrangement of FIGS. 6 to 9.

In this embodiment, the receiver 2 is carried out with an evaluation chip 7 on the upper side of which a reception surface 3 is formed as a segmented photodiode. The photodiode comprises a first central area 41. In the depicted embodiment, the first area 41 has a rectangular shape. The first area 41 is surrounded by a second area 41 in a ring-shape. The second area 42 is surrounded by a third area 43 in a ring-shape. The third area 43 is surrounded by a fourth area 44 in a ring-shape. The second, third and fourth area each have a rectangular inner contour and a rectangular outer contour. Depending on the chosen embodiment, the ring-shaped areas 42, 43, 44 may have the same or different widths. Particularly, the fourth and hence outer area 44 may have a larger width than the third and/or the second area 43, 42.

Depending on the chosen embodiment, the first area 41 may not be embodied as a reception surface and thus, only the second, third and fourth area 42, 43, 44 may be embodied as segmented photodiode areas. Depending on the respective measuring situation, at least one of the areas 41, 42, 43, 44 may not be taken into account during evaluation of the received reflected measuring radiation 15.

Figure 13:
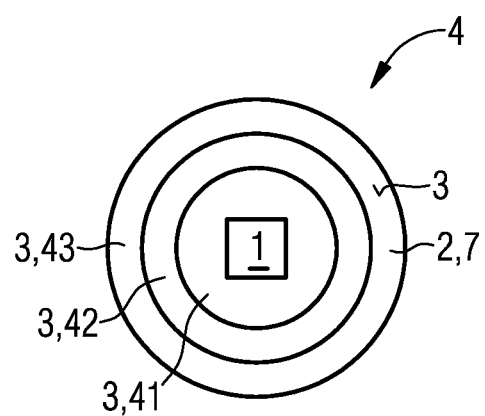
FIG. 13 depicts a schematic top view of a further embodiment of the receiver with reception surfaces having circular ring shapes.

FIG. 13 depicts an embodiment basically corresponding to the design of the arrangement of the transmitter and receiver of FIG. 12. In this context, a receiver 2 having an evaluation chip 7 is provided, on the upper side of which a reception surface 3 is formed. In the center of the reception surface 3, a transmitter 1 is arranged. The transmitter 1 is arranged on a first circularly shaped area 41. The first circularly shaped area 41 is surrounded by a circular ring-shaped second area 41. The second ring-shaped area 42 is surrounded by a third ring-shaped area 43. Depending on the chosen embodiment, a fourth area 44 may surround the circular ring shape of the third area 43 in a ring shape. The individual areas 41, 42, 43, 44 may be formed as segmented areas of a segmented photodiode. In this way, depending on the chosen embodiment, at least one of the areas 41, 42, 43 may not be taken into account for evaluation of the received reflected measuring radiation 15. In addition, depending on the chosen embodiment, the first area 41 may be formed as an inactive reception surface or, respectively, it may not be formed as a reception surface 3. This embodiment may be advantageous if too much interference radiation 37 is received in the first area 41 due to the existing measuring arrangement.

The reception surface 3 may be formed as a photodiode with segmented areas wherein the segmented areas 41, 42, 43, 44 may be individually connected or disconnected for evaluating the reflected measuring radiation. In case of a small air gap to the covering 5, all segments 41, 42, 43, 44 may thus be used for evaluation. In case of a larger air gap between the transmitter and the covering 5, individual segments may be excluded for evaluation. The larger the air gap becomes, the more areas or segments of the photodiode are switched off. The areas or segments may be embodied in such a way that their structure is smaller in the critical area than in the non-critical area. A critical area is characterized by a probability for a higher interference radiation. As a result, an adjustment to the measuring situation may be carried out in a precise manner without losing too much sensitivity due to the decrease in reception surface. The segments, i.e., the areas 41, 42, 43, 44 of the photodiode may be carried out as desired. For example, the areas may be rectangular, ring-shaped or they may have different shapes.

By switching off selected segmented areas 41, 42, 43, 44 of the reception surface 3, a cross-talk may be faded out depending on the assembling situation of the measuring arrangement. As a result, the measuring arrangement may be operated in an optimized manner for a specific assembling situation. The measuring arrangement 4 is an optical sensor, wherein the sensor surface is geometrically optimized in order to allow for as small an aperture in the housing as possible.

The measuring arrangement is, e.g., suitable for detecting a pulse of a person and/or for detecting a blood composition, in particular an oxygen concentration. For this purpose, infrared radiation is used as a measuring radiation. Furthermore, the measuring arrangement may be used as a proximity sensor.

The present invention was depicted and described in detail in connection with preferred embodiment examples. However, the present invention is not limited to the disclosed examples. Rather, a person skilled in the art may derive other variations without exceeding the invention's protective scope.

The invention claimed is:
1. A measuring arrangement comprising:
an optical transmitter configured to transmit electromagnetic measuring radiation into a transmission space;
an optical receiver configured to receive measuring radiation reflected by an object in a reception space; and
a covering configured to reduce reception of an interference radiation by the receiver,
wherein the interference radiation is measuring radiation not reflected by the object,
wherein the transmitter is arranged in the reception space,
wherein the reception space abuts on the receiver at a reception surface,
wherein the transmitter covers a partial surface of the reception surface against reception of reflected measuring radiation,
wherein the reception surface comprises an inactive surface area,
wherein the inactive surface area at least partly comprises a ring shape around a shadowed partial surface, and
wherein the receiver does not evaluate measuring radiation striking in the inactive surface area.

2. The arrangement according to claim 1, wherein the covering is at least partly arranged in the transmission and reception spaces, wherein the covering comprises a passage area, wherein the passage area is transparent for the measuring radiation and transparent for reflected measuring radiation, wherein the passage area at least partially limits the transmission and reception spaces, and wherein the passage area is embodied as a continuous surface.

3. The arrangement according to claim 1, wherein no reception surface is provided in the inactive surface area or the reception surface is covered or the reception surface is deactivated.

4. The arrangement according to claim 3, wherein a lens is held in a retainer at a distance to the transmitter, wherein the retainer is arranged on the reception surface or the receiver, and wherein the retainer surrounds or covers the transmitter.

5. The arrangement according to claim 1, further comprising a lens located in the transmission space, wherein the lens is configured to focus the radiation on a target region.

6. The arrangement according to claim 5, wherein the lens is formed from a molding material, and wherein the lens covers the transmitter and at least partially the receiver.

7. An arrangement comprising:
an optical transmitter configured to transmit electromagnetic measuring radiation into a transmission space;
an optical receiver configured to receive measuring radiation reflected by an object in a reception space; and
a covering configured to reduce reception of an interference radiation by the receiver,
wherein the interference radiation is measuring radiation not reflected by the object,
wherein the receiver comprises a reception surface configured to receive the reflected measuring radiation,
wherein the reception surface is divided up into at least two partial surfaces, wherein at least a partial surface of the partial surfaces is configured to be activated or deactivated,
wherein the receiver is configured to detect the reflected measuring radiation via the partial surface in an active state,
wherein the receiver is configured to not detect the reflected measuring radiation via the deactivated partial surface in an inactive state,
wherein the partial surfaces have a ring-shaped configuration,
wherein the transmitter is arranged in the reception space,
wherein the transmitter covers a part of the reception space against reception of reflected measuring radiation, and
wherein the reception space abuts on the receiver in the reception surface.

8. The arrangement according to claim 7, further comprising a covering at least partly arranged in the transmission and reception spaces, the covering comprising a passage area, the passage area configured to be transparent for the measuring radiation and for reflected measuring radiation, wherein the passage area at least partly comprises the transmission space and at least partly the reception space, and wherein the passage area comprises a continuous surface.

9. The arrangement of claim 7, wherein the partial surfaces have a ring-shaped configuration, or wherein the partial surfaces are striped rings with angled corner areas.

10. The arrangement of claim 7, wherein the reception surface is configured as a segmented photodiode, wherein the partial surfaces represent segments of the photodiode, and wherein the segments are evaluated independently.

11. The arrangement according to claim 1, wherein the receiver comprises a reception surface configured to receive the reflected measuring radiation, wherein the entire reception surface is located in the reception space, and wherein the reflected measuring radiation strikes the receiver via a passage area.

12. The arrangement according to claim 1, wherein the receiver comprises a reception surface configured to receive the reflected measuring radiation, and wherein the reception surface has at least a partial circle shape corresponding to the reception space.

13. The arrangement according to claim 1, wherein the transmitter and/or the receiver comprises an optical element configured to guide the radiation.

14. The arrangement according to claim 1, wherein the transmitter is arranged on the receiver.

15. The arrangement according to claim 1, wherein the receiver comprises a reception surface arranged on an evaluation chip, and wherein the reception surface has a smaller area than the evaluation chip.

* * * * *